United States Patent [19]
Maeda

[11] Patent Number: 5,145,497
[45] Date of Patent: Sep. 8, 1992

[54] IN-LINE FILTER DEVICE FOR COMPRESSED AIR HAVING MIST FILTER AND AIR COLLECTOR

[75] Inventor: Sadao Maeda, Okazaki, Japan
[73] Assignee: Maeda Shell Service Co., Ltd., Aichi, Japan
[21] Appl. No.: 764,831
[22] Filed: Sep. 24, 1991
[30] Foreign Application Priority Data Mar. 13, 1991 [JP] Japan ............................... 3-22333[U]

[51] Int. Cl.$^5$ .............................................. B01D 46/00
[52] U.S. Cl. ........................................ 55/219; 55/323; 55/466
[58] Field of Search ......................... 55/219, 323, 466

[56] References Cited
U.S. PATENT DOCUMENTS

| | | |
|---|---|---|
| 2,528,539 | 11/1950 | Norgren et al. ...................... 55/323 |
| 4,487,618 | 12/1984 | Mann .................................... 55/323 |
| 4,897,094 | 1/1990 | Maeda .................................. 55/219 |
| 4,925,466 | 5/1990 | Overby ................................. 55/219 |

Primary Examiner—Bernard Nozick
Attorney, Agent, or Firm—Parkhurst, Wendel & Rossi

[57] ABSTRACT

An in-line filter device including a partition member, and a lower housing and an upper housing which are held in a fluid communication with each other through at least one intermediate passage formed through the partition member. The lower housing has a radially inner and a radially outer filter having respective packings, for separating vapor and/or liquid particles in compressed air, and accommodates a draining device for discharging the trapped vapor and/or liquid particles. The upper housing has a mist filter of an annular porous structure for further separation of the remaining vapor and/or liquid particles in the compressed air, and an air collector disposed inside the mist filter, for delivering the filtered air.

10 Claims, 4 Drawing Sheets

IN-LINE FILTER DEVICE FOR COMPRESSED AIR HAVING MIST FILTER AND AIR COLLECTOR

BACKGROUND OF THE INVENTION

1. Field of the Invention

The present invention relates in general to an in-line filter device connected to a compressed air line, and more particularly to such an in-line compressed air filter device having an improved structural arrangement, which is capable of efficiently separating or removing liquid or vapor particles from the compressed air, such as water and oil which are contained therein.

2. Discussion of the Prior Art

Conduits used for supplying compressed air to various pneumatically operated components employed in various factories, atomic plants and medical equipment, for example, are generally provided with an in-line filter device or vapor trap assembly for removing water and/or oil vapor contained in a stream of the compressed air, for the purpose of protecting the pneumatic components or improving the performance of those components.

A type of such an in-line filter device for compressed air, adapted to minimize vapor and/or liquid particles contained in the compressed air, has been disclosed in U.S. Pat. No. 4,487,618 to David O. Mann. The disclosed filter device includes a vaporizer cartridge as first filter means having a suitable first packing or pad inside a sleeve thereof, and another vaporizer cartridge as second filter means having a suitable second packing or pad inside a sleeve thereof. The first and second filter means are disposed parallel with each other, so as to extend in the vertical direction from a base which provides an air-tightly enclosed trap structure having a suitable volume capacity, such that each of the first and second filter means communicates with an enclosed volume or trap chamber formed within the trap structure. The compressed air is directed to the trap chamber through the first filter means from an intake or inlet conduit, so that vapor (oil vapor) and/or liquid particles contained in the compressed air are condensed or coalesced into droplets, whereby the vapor and/or liquid particles are separated from the compressed air, and the droplets are captured within the trap chamber. Subsequently, the compressed air from which the vapor and/or liquid particles have been separated is directed to an outlet conduit through the second filter means from the trap chamber, so that any remaining liquid particles are vaporized. Thus, the amount of the vapor and/or liquid particles entrained in the air entering the outlet conduit is minimized.

In the in-line filter device as described above, the first packing of the first filter means is a wound wire mesh fabric formed of stainless steel fibers, while second packing of the second filter means is a wound fabric material formed of cotton fibers or other absorbing materials. However, such wound packings may have a gap or clearance between the inner circumferential surfaces of the filter sleeves and the outer circumferential surfaces of the packings, depending upon the winding condition of the fabrics of the packings. Therefore, the compressed air flowing through the thus formed gap or clearance potentially existing with the packings may be delivered to the outlet conduit, without removal of oil and/or liquid particles from the air during passage thereof through first and second filter means.

To overcome such a drawback, the assignee of the present invention has proposed an in-line filter device which assures improved efficiency of removal of the liquid particles from the compressed air, as disclosed in Japanese Utility Model Application No. 2-124392. The disclosed filter device includes a suitable cylindrical foam member disposed within the cylindrical sleeve of the second filter means such that the foam member is on the downstream side of the second packing, so as to further remove the remaining liquid particles contained in the compressed air which has passed through the first and second packings.

However, the thus constructed in-line filter device is still incapable of removing a sufficient amount of liquid particles, and thus incapable of delivering the compressed air free of oil and/or liquid particles to the outlet conduit. Further, the in-line filter device wherein the first and second filter means are disposed side and by side parallel to each other, each having an independent cylindrical structure standing on an air tightly enclosed trap structure, tends to be comparatively large sized. However, it is required to construct such an in-line filter device as compact as possible. In this sense, there still remains room for improvement in the construction of an in-line filter device of the type a described above.

SUMMARY OF THE INVENTION

The present invention was developed in view of the above situations in the prior art. It is therefore an object of the invention to provide an improved in-line filter device which is capable of highly efficiently removing liquid particles such as water and oil vapor contained in compressed air flowing through a conduit, and which is compact in construction.

The above object may be accomplished according to the principle of the present invention, which provides an in-line filter device comprising: a) a partition member having an inlet passage open on a central part of a lower surface thereof, for introducing a flow of the compressed air, at least one intermediate passage formed through a thickness thereof between a central portion and a peripheral portion thereof, and an outlet passage open on a central part of an upper surface thereof, for delivering the compressed air; b) a lower housing which is closed at one of opposite ends thereof and open at the other end, the lower housing being fluid-tightly attached at said other end thereof to a lower portion of the partition member, and cooperating with the partition member to define a lower enclosed space whose lower part provides a sump for storing a liquid which is separated from the compressed air as a result of condensation or coalescence of vapor or liquid particles contained in the compressed air; c) first filter means disposed in a central portion of an upper port of the enclosed space, and including a sleeve and a first packing filling an interior of the sleeve, the first packing receiving the compressed air introduced through the inlet passage, and condensing or coalescing the vapor or liquid particles into the liquid; d) second filter means including an annular member disposed radially outwardly of the sleeve of the first filter means, and a second packing filling an interior of the annular member, the second packing receiving the compressed air from the lower part of the enclosed space and directing the compressed air into the at least one intermediate passage; e) draining means disposed in a bottom portion of the sump for discharging the liquid from the sump to an outside of the in-line filter device; f) an upper housing which is closed at one of opposite ends thereof and open at the other end, the upper housing being fluid-tightly attached at said other end thereof to an upper portion of the partition member, and cooperating with the partition member to define an upper enclosed space which communicates with the lower enclosed space through the at least one intermediate passage; g) a mist filter having an annular porous structure and being disposed within the upper enclosed space so as to cause the compressed air from the at least one intermediate passage to flow through the annular porous structure in a direction from an outside to an inside of the porous structure, for separation of remaining vapor or liquid particles from the compressed air while the compressed air is flowing through the porous structure; and h) an air collector disposed inside the annular porous structure of the mist filter, and communicating with the outlet passage for delivering the compressed air.

As is apparent from the above description of the present in-line filter device, the compressed air from which the vapor or liquid have been removed during passage of the first and the second filter means is further passed through the mist filter for separation of any remaining vapor or liquid particles. Thus, the compressed air substantially free from the vapor or liquid particles is directed to the outlet conduit through the air collector which is disposed inside the annular porous structure of the mist filter and which has a predetermined height, whereby the compressed air delivered to a suitable pneumatically operated components. Therefore, the vapor and liquid particles remaining in the compressed air after passage through the first and second filter means are effectively separated during passage of the mist filter and the trapped liquid particles are effectively discharged out of the device through the drain passage communicating with the inner space formed between the air collector and the inner circumferential surface of the mist filter. Accordingly, the in-line filter device for compressed air of the above construction is capable of effectively filtering the compressed air, so that the filtered air substantially free from the vapor and/or liquid particles is supplied to the pneumatically operated components.

In the present in-line filter device for compressed air, the first and the second filter means are disposed substantially concentrically with each other, and the mist filter is disposed substantially coaxially with those first and second filter means, such that the two filter means and the mist filter are held in suitable fluid communication with each other, through the partition member disposed therebetween. Accordingly the device is simple and compact in construction.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE INVENTION

To further clarify the present invention, there will be described in detail a preferred embodiment of the invention referring to accompanied drawings.

Figure 1:
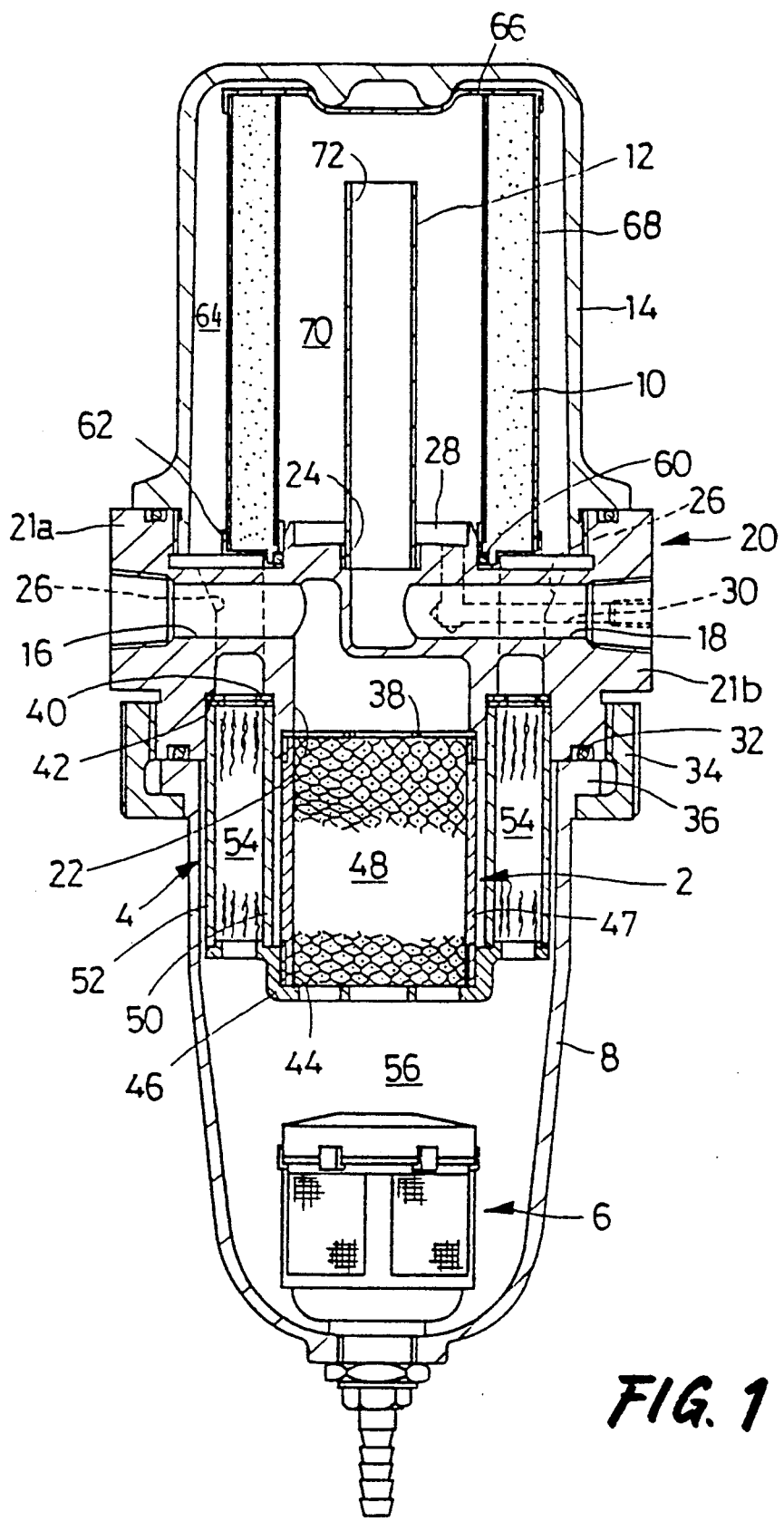
FIG. 1 is an elevational view in longitudinal cross section of an in-line filter device embodying the present invention.

Referring first to FIG. 1, there is shown one embodiment of an in-line filter device of the invention connected to a compressed air line. In the figure, the filter device includes a lower housing 8, an upper housing 14 and a partition member 20. The lower housing 8 accommodates first and second filters 2, 4 and an automatic draining unit 6, while the upper housing 14 accommodates a mist filter 10 and an air collector 12. The partition member 20 includes inlet and outlet passages 16, 18 and is disposed so a to be sandwiched by and between the lower and upper housings 8, 14.

Figure 2:
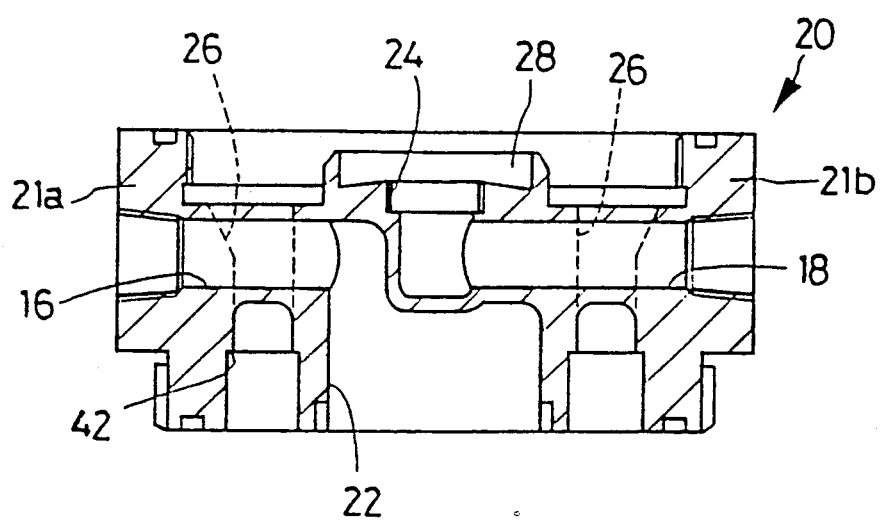
FIG. 2 is an elevational view in cross section of a partition member used in the filter device of FIG. 1.
Figure 3:
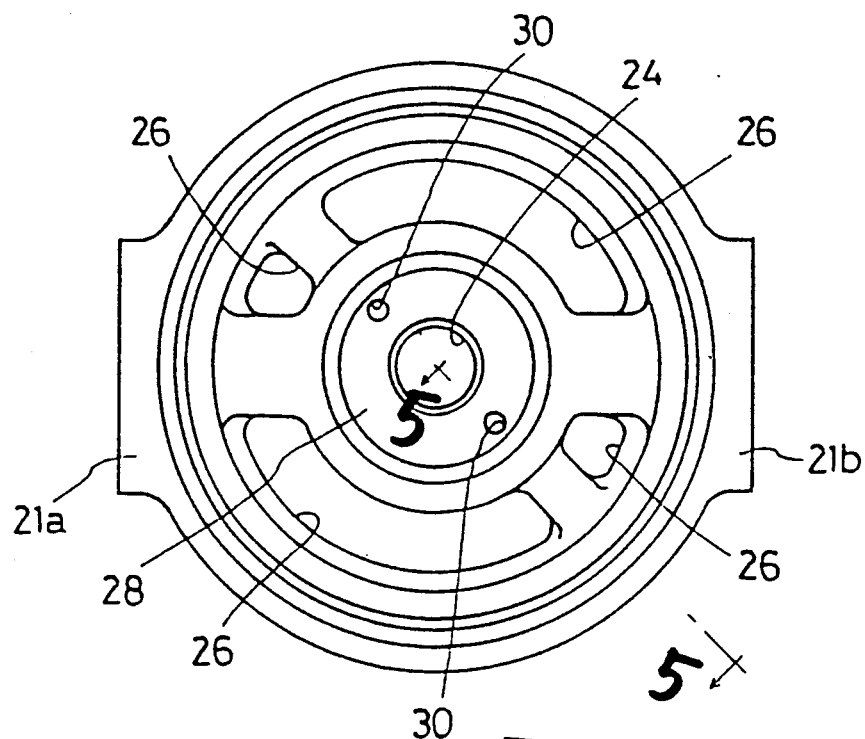
FIG. 3 is a top plan view of the partition member of FIG. 2.
Figure 4:
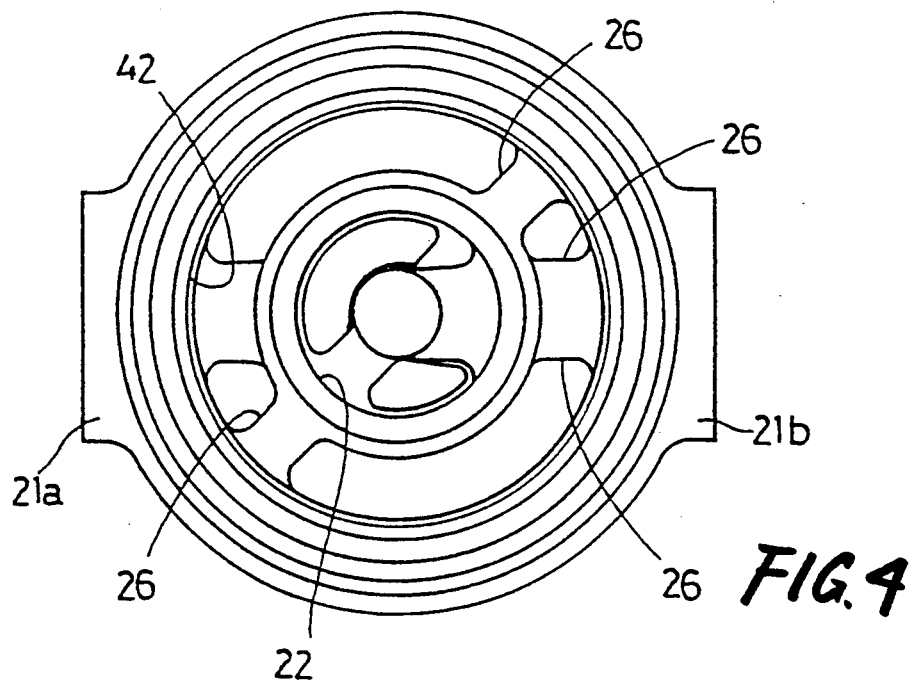
FIG. 4 is a bottom plane view of the partition member of Fig, 2.

More specifically, as seen in FIGS. 2-4, the partition member 20 is a generally circular member with relatively large wall thickness having a first and a second ear portion 21a, 21b which are formed opposite to each other diametrically of the partition member 20. The ear portions 21a, 21b protrude in the radially outward direction of the partition member 20. The inlet passage 16 is open at one of the opposite ends thereof on an outer circumference surface of the first ear 21a while the other end thereof is connected to a lower opening 22 which is open on a central part of a lower surface of the partition member 20. On the other hand, the outlet passage 18 is open at one of opposite ends thereof on an outer surface of the second ear 21b, while the other end thereof is connected to an upper opening 24 which is open on a central part of an upper surface of the partition member 20. The partition member 20 further includes four intermediate passages 26 formed through a thickness thereof between the radially central and peripheral portions of the partition member 20. The lower and upper housings 8, 14 are held in the fluid communication with each other, through the intermediate passages 26, as described below.

Figure 5:
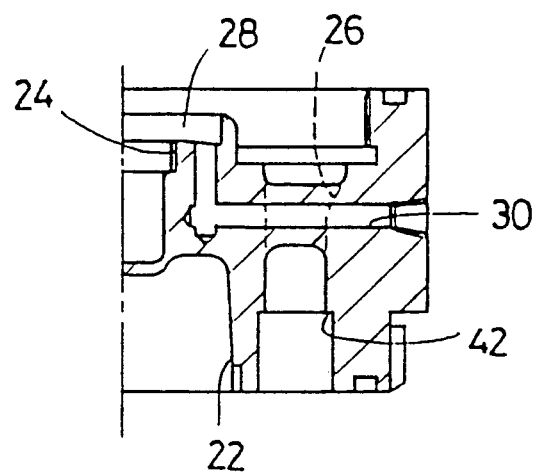
FIG. 5 is a cross sectional view taken along line 5—5 of FIG. 3.

The partition member 20 further has a liquid receiver 28 formed in the central portion of the upper surface thereof, and drain passages 30 as seen in FIG. 5. The liquid receiver 28 communicates with the upper opening 24 of the partition member 20, which communicates with the outlet passage 18. The drain passages 30 communicate at one of its opposite ends with the tapered bottom surface of the liquid receiver 28 and at the other end with the outer circumferential surface of the partition member 20. The openings of the drain passages 30 are spaced from the openings of the inlet and outlet passages 16, 18 by predetermined angular distances in the circumferential direction of the partition member 20

The cylindrical lower housing 8 which is closed at one of opposite ends thereof and open at the other end is fluid-tightly attached to a lower portion of the partition member 20 and cooperates with the partition member to define a lower enclosed space, with an O-ring 32 interposed therebetween. More specifically, the lower housing 8 has a flange 36 formed on the outer circumferential surface at the open end thereof. A fastening nut 34 is screwed on the outer surface of the lower end portion of the partition member 20, such that the nut 34 engages the flange 36 of the partition member 20. The lower enclosed space thus formed receives compressed air through the inlet passage 16 formed through the partition member 20.

In a radially central portion of an upper part of the lower enclosed space of the lower housing 8, there is disposed the first filter 2, while the second filter 4 is disposed radially outwardly of the first filter 2.

More specifically, the first filter 2 is composed of a cylindrical sleeve 47, a first packing 48 consists of a wound wire mesh fabrics formed of stainless steel fibers or other metallic materials, which fills the interior of the sleeve 47, and a circular closure plate 38 which has a plurality of holes and which closes the axially upper end of the sleeve 47.

On the other hand, the second filter 4 is an annular member having an annular space defined by an inner and an outer tube 50 and 52 which are disposed radially outwardly of the cylindrical sleeve 47 of the first filter 2, in radially spaced coaxial relation with each other. The inner tube 50 has an inside diameter considerably larger than an outside diameter of the sleeve 47 by a suitable small amount. The outer tube 52 has substantially the same length as the inner tube 50 and a diameter larger than that of the inner tube 50. The second filter 4 further includes a second packing 54 consisting of a wound fabric material formed of cotton fibers for example, which fills the interior of the annular member, and an annular closure plate 40 secured to the upper ends of the tubes 50, 52.

The first filter 2 is threaded to the partition member 20, such that the first filter 2 communicates with the lower opening 22 through a plurality of holes formed through the closure plate 38, which is disposed in abutting contact with the upper end face of the first filter 2. The upper end of the second filter 4 is held in abutting contact with an annular shoulder 42 of the partition member 20, with the annular closure plate 40 interposed therebetween. The shoulder 42, which communicates with the lower portion of each intermediate passage 26, is formed radially outwardly of the lower opening 22, and is located nearer to the upper end of the partition member 20, than the lower end of the opening 22 at which the first filter 2 is threaded to the partition member 20. In this arrangement, the first filter 2 projects downwardly at its lower end from the lower end of the second filter 4. The second filter 4 communicates with the intermediate passages 26 through a plurality of holes formed through the annular closure plate 40.

A filter support 46 is provided to hold the second filter 4 in position. The filter support 46 has a recessed portion 44 which has an internal thread engaging the lower end portion of the first filter 2. The second filter 4 is retained in position, with its lower end face held in abutting contact with the filter support 46. The filter support 46 has a plurality of holes for communication with the first and second filters 2, 4.

The lower part of the lower enclosed space of the lower housing 8 provides a sump 56 for storing a liquid which is separated from the compressed air as a result of condensation or coalescence of a vapor or liquid particles contained in the compressed air. The liquid separated from the compressed air is discharged by the automatic draining unit 6 accommodated in a bottom portion of the sump 56, to the outside of the in-line filter device. As the automatic draining unit 6 of the present invention, a device disclosed in U.S. Pat. No. 5,011,519 may be preferably employed. However, it is not limited to the above-indicated device but may be replaced with other known automatic draining devices.

The upper housing 14 which is closed at one of its opposite ends thereof and open at the other end is fluid-tightly attached to an upper portion of the partition member 20 such that the opening of the housing 14 is threaded to the partition member 20, with an O-ring interposed therebetween, so as to define an upper enclosed space which communicates with the lower enclosed space of the lower housing 8 through the intermediate passages 26.

The thus defined enclosed space of the upper housing 14 accommodates the mist filter 10, which has an annular porous structure having a predetermined wall thickness in the radial direction of the device. The mist filter 10 is disposed substantially concentrically with the first and second filters 2, 4 so as to define an inner space 70 and an outer annular space 64. The mist filter 10 is fluid tightly attached to the partition member 22 via an O-ring 60, such that the lower end of the mist filter 10 is located radially outward of the liquid receiver 28, and the mist filter 10 is supported at the lower end by a support plate 62. The outer annular space 64 communicates with the lower enclosed space of the lower housing 8 through the intermediate passages 26. The upper end of the mist filter 10 is closed by a closure plate 66, whereby the mist filter 10 is fixed to the upper housing 14.

The material for the mist filter 10 of the present invention may be selected from those of known mist filters of annular porous structure, such as soft or hard polyurethane foams, sintered resins or glass fibers, which have minute pores. In the thus constructed mist filter 10, the compressed air introduced into the annular space 64 is forced to flow through the porous structure from an outside to an inside thereof so as to separate the remaining vapor or liquid particles from the compressed air while the compressed air is flowing through the porous structure. In the present embodiment, the inner and outer circumferential surfaces of the mist filter 10 are covered with a suitable filter screen 68, which may consist of a metallic material of network structure or laminated cotton fabrics, for example. However, the mist filter may be constructed without such a screen.

The upper housing 14 further accommodates the air collector 12, in a substantially central portion of the inner space 70 defined by the inner circumference surface of the mist filter 10. The air corrector 12 is a generally cylindrical member having a relatively small wall thickness. This cylindrical member is fluid-tightly secured, at one of its opposite ends, to the upper opening 24 which is open in the central portion of the upper surface of the liquid receiver 28. The air collector 12 is open at the other end, which is located a predetermined distance upward of the partition member 20. The opening of the air collector 12 is preferably located such that the liquid particles separated from the compressed air which has flowed through the mist filter 10 from the outer space 64 into the inner space 70 should not enter the air collector 12. Further, the diameter of the collector 12 is preferably determined such that the air collector 12 and the inner circumferential surface of the mist filter 10 provide an annular space whose volume is sufficient for storing the droplets separated from the compressed air by the mist filter 10.

In the thus constructed in-line filter device, compressed air is initially directed through the inlet passage 16 into the first filter 2 which has a larger cross sectional area for the air flow than the inlet conduit. While the compressed air is passed through the first filter 2, vapor and/or particles of water and oil contained in the compressed air are condensed or coalesced into droplets and then trapped by adiabatic expansion of the compressed air and by passage of the air through the first packing 48. The thus condensed, coalesced or trapped droplets (liquid) are carried into the sump 56 of the lower housing 8 by the flow of the compressed air through the filter device.

In the sump 56, the condensation or coalescence of vapor contained in the compressed air is further effected by a further adiabatic expansion effect which is caused by a larger cross sectional area of the sump 56 than that of the first filter 2. Thus, the velocity of the compressed air which flows into the sump 56 is lowered, whereby the liquid in the form of droplets flowing with the compressed air is effectively separated from the compressed air and falls by gravity and centrifugal force, onto the automatic draining unit 6 so that liquid is discharged out of the in-line filter device.

Subsequently, the compressed air from which the vapor or liquid particles have been thus separated by the condensation and the coalescence is introduced into the second filter 4 disposed radially outwardly of the first filter 2. Since the second filter 4 has a smaller cross sectional area than the sump 56 of the lower housing 8, the air is subjected to adiabatic compression. Further, due to turbulence of the air flow during passage through the second packing 54 of the second filter 4, water and oil remaining in the compressed air a liquid particles are vaporized. The compressed air which has passed through the second packing 54 is then introduced into the outer annular space 64 of the upper housing 14 through the intermediate passages 26 formed through the partition member 20 and pass through the mist filter 10 into the inner space 70, whereby the remaining liquid particles contained in the air are substantially completely trapped by the mist filter 10. Accordingly, the dried compressed air substantially free of oil and/or liquid particles is directed to the outlet conduit via the air collector 12 accommodated within the inner space 70, the upper opening 24 of the partition member 20 and the outlet passage 18. The air collector has a bore 72 which is open at one of opposite ends thereof, at a predetermined distance remote from the partition member 20.

The liquid particles trapped during passage of the compressed air through the mist filter 10 gradually fall within the interior of the mist filter 10, and stored in the bottom portion of the filter 10. The stored liquid is then discharged out of the mist filter 10 and flows into the liquid receiver 28. The liquid stored in the liquid receiver 28 is then discharged out of the device through the drain passages 30 open in the bottom of the receiver 28.

Accordingly, the above-constructed in-line filter device of the present invention is capable of advantageously delivering the compressed air substantially free of oil and/or liquid particles, to various pneumatically operated components. Since the mist filter 10 effectively removes the liquid particles remaining in the compressed air which has flowed through the second filter 4, and the air collector 12 having a predetermined height is disposed in the inner space 70, the liquid particles trapped during passage of the compressed air through the mist filter 10 are less likely to enter into the inner bore 72 of the air collector 12.

While the presently preferred embodiment of the invention has been described and illustrated in detail, it is to be understood that the invention is not limited to the details of the illustrated embodiment but may be embodied with various changes modifications and improvements which may occur to those skilled in the art, without departing from the spirit and scope of the invention defined in the following claims.

What is claimed is:

1. An in-line filter device connected in an air line through which compressed air flows, comprising:

a partition member having an inlet passage open on a central part of a lower surface thereof, for introducing a flow of the compressed air, at least one intermediate passage formed through a thickness thereof between a central portion and a peripheral portion thereof, and an outlet passage open on a central part of an upper surface thereof, for delivering the compressed air;

a lower housing which is closed at one of opposite ends thereof and open at the other end, said lower housing being fluid-tightly attached at said other end thereof to a lower portion of said partition member, and cooperating with said partition member to define a lower enclosed space whose lower part provides a sump for storing a liquid which is separated from the compressed air as a result of condensation or coalescence of vapor or liquid particles contained in the compressed air;

first filter means disposed in a central portion of an upper part of said enclosed space, and including a sleeve and a first packing filling an interior of said sleeve, said first packing receiving the compressed air coalescing said vapor or liquid particles into said liquid;

second filter means including an annular member disposed radially outwardly of said sleeve of said first filter means, and a second packing filling an interior of said annular member, said second packing receiving the compressed air from said lower part of said enclosed space and directing the compressed air into said at least one intermediate passage;

draining means disposed in a bottom portion of said sump, for discharging said liquid from said sump to an outside of the in-line filter device;

an upper housing which is closed at one of opposite ends thereof and open at the other end, said upper housing being fluid-tightly attached at said other end thereof to an upper portion of said partition member, and cooperating with said partition member to define an upper enclosed space which communicates with said lower enclosed space through said at least one intermediate passage;

a mist filter having an annular porous structure and being disposed within said upper enclosed space so as to cause the compressed air from said at least one intermediate passage to flow through said annular porous structure in a direction from an outside to an inside of said porous structure, for separation of remaining vapor or liquid particles from the compressed air while the compressed air is flowing through said porous structure; and an air collector disposed inside said annular porous structure of said mist filter, and communicating with said outlet passage for delivering the compressed air after being filtered.

2. The in-line filter device of claim 1, wherein said upper housing and said annular porous structure of said mist filter cooperate with each other to define an annular space which communicates with said at least one intermediate passage.

3. The in-line filter device claim 1, wherein said annular porous structure of said mist filter extends close to a bottom wall which defines said one end of said upper housing, said air collector having opposite open ends one of which communicates with said outlet passage and the other of which is spaced apart from said bottom wall of the upper housing.

4. The in-line filter device of claim 1, wherein said partition member has a generally circular shape, and said at least one intermediate passage consists of a plurality of intermediate passages which are formed through a radially intermediate portion of said partition member.

5. The in-line filter device of claim 1, wherein said partition member includes a liquid receiver formed on said upper surface thereof, between an inner circumferential surface of said annular porous structure of said mist filter and a liquid receiver receiving a liquid separated from the compressed air by said mist filter.

6. The in-line filter device of claim 5, wherein said partition member has a drain passage which communicates at one of opposite ends with said liquid receiver and at the other end with an outside of the device.

7. The in-line filter device of claim 1, wherein said sleeve of said first filter means is secured to said partition member, at one of opposite ends thereof which is remote from said draining means.

8. The in-line filter device of claim 7, further comprising a filter support which is secured to the other end of said sleeve of said first filter means.

9. The in-line filter device of claim 8, wherein said filter support supports said annular member of said second filter means at one end of said annular member remote from said partition member.

10. An in-line filter device of claim 8, wherein said filter support includes a recessed portion having an internal thread engaging the end portion of said sleeve of said first filter means remote from said partition member.

* * * * *